(12) United States Patent
Fortin et al.

(10) Patent No.: US 9,400,542 B2
(45) Date of Patent: *Jul. 26, 2016

(54) METHOD AND SYSTEM FOR DETECTING AN OBJECT OR BODY BASED ON CHANGES IN SIGNAL PHASES

(71) Applicant: Logitech Europe S.A., Lausanne (CH)

(72) Inventors: Frederic Fortin, Annemasse (FR); Laurent Cariou, Versonnex (FR); Philippe Chazot, Saint-Jorioz (FR)

(73) Assignee: Logitech Europe S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,758

(22) Filed: Aug. 4, 2015

(65) Prior Publication Data

US 2015/0338900 A1 Nov. 26, 2015

(51) Int. Cl.
| | |
|---|---|
| *G06F 1/32* | (2006.01) |
| *H04W 24/08* | (2009.01) |
| *G06F 3/023* | (2006.01) |
| *G06F 3/0354* | (2013.01) |

(52) U.S. Cl.
CPC ............ *G06F 1/3231* (2013.01); *G06F 1/3259* (2013.01); *G06F 3/0231* (2013.01); *G06F 3/03543* (2013.01); *H04W 24/08* (2013.01); *Y02B 60/1253* (2013.01); *Y02B 60/1289* (2013.01); *Y02B 60/50* (2013.01)

(58) Field of Classification Search
CPC ......... G01S 13/04; G01S 13/56; G01S 15/04; G01S 15/523; H04B 5/0043
USPC .............. 455/67.11, 67.16, 67.7, 115.1, 41.1, 455/41.2; 342/27, 28; 340/573.1
See application file for complete search history.

(56) References Cited

U.S. PATENT DOCUMENTS

| | | | |
|---|---|---|---|
| 9,128,714 B2 * | 9/2015 | Fortin | G06F 1/3231 |
| 2002/0063477 A1 | 5/2002 | Chang et al. | |
| 2005/0122223 A1 * | 6/2005 | Jones | G08B 13/2491 340/573.1 |
| 2007/0046634 A1 | 3/2007 | Rice, Jr. | |
| 2010/0156790 A1 | 6/2010 | Su et al. | |
| 2012/0019149 A1 * | 1/2012 | Shih | H05B 37/0227 315/149 |
| 2012/0280917 A1 | 11/2012 | Toksvig et al. | |
| 2012/0287035 A1 | 11/2012 | Valko | |
| 2014/0125575 A1 | 5/2014 | Samanta Singhar | |
| 2015/0103006 A1 | 4/2015 | Hemes et al. | |

OTHER PUBLICATIONS

Non-Final Office Action mailed on Apr. 10, 2015 for U.S. Appl. No. 14/052,030, 14 pages.
Notice of Allowance mailed on Aug. 27, 2015 for U.S. Appl. No. 13/772,122, 5 pages.

(Continued)

*Primary Examiner* — Nguyen Vo
(74) *Attorney, Agent, or Firm* — Kilpatrick Townsend & Stockton LLP

(57) ABSTRACT

Embodiments of the invention are directed to control devices configured for use with computing devices. More specifically, the present invention relates to methods and devices for performing presence detection of an object body near a device. The methods and devices described herein may include comparing a reference signal against an over the air signal to determine whether a phase difference exists between the reference signal and the over the air signal. The existence of a phase difference may be indicative of a object or body in proximity to the device.

20 Claims, 4 Drawing Sheets

(56) References Cited

OTHER PUBLICATIONS

Final Office Action mailed on Sep. 17, 2015 for U.S. Appl. No. 14/052,030, 17 pages.

Non-Final Office Action mailed on Apr. 5, 2016 for U.S. Appl. No. 14/052,030, 15 pages.

Notice of Allowance mailed on Jun. 8, 2016 for U.S. Appl. No. 14/052,030, 7 pages.

* cited by examiner

METHOD AND SYSTEM FOR DETECTING AN OBJECT OR BODY BASED ON CHANGES IN SIGNAL PHASES

CROSS-REFERENCES TO RELATED APPLICATIONS

This application is a continuation of U.S. patent application Ser. No. 13/772,122, filed Feb. 20, 2013, the disclosure of which is hereby incorporated by reference in its entirety.

BACKGROUND OF THE INVENTION

Presence detection in control devices is currently being used to provide users with benefits that non-presence detecting control devices may lack. For example, the detected presence of a user may cause a backlighting feature of a keyboard or a remote control device to activate. In other examples, the detected presence of the user may activate the power to a wireless control device, such as a mouse or keyboard, such that when the presence of the user is not detected, power consumption is minimized to extend battery life.

One way of detecting the presence of a user would be a pulse radar system that would send a pulse from a transmitter and then measure the amount of time taken for the pulse to be reflected back and received by a receiver coupled to the transmitter. A limitation with this system is that the time taken for the pulse to be transmitted, reflected back, and received is too short to get accurate readings, as the distance between a user and the control device (e.g., keyboard, mouse) is typically very short.

Despite advancements related to methods of presence detection in association with control devices, there is a need in the art for improved methods and systems related to detecting the presence of a user relative to a control device.

SUMMARY OF THE INVENTION

The present invention relates generally to control devices, such as human interface devices, configured for use with electronics or computing devices. More specifically, the present invention relates to methods and systems for detecting the presence of a user by a control device by detecting changes in a signal outputted from a transmitter and received by a receiver.

Embodiment of the present invention may provide a device comprising, a transmitter configured to emit a signal, an in-phase divider coupled to the transmitter and configured to receive the signal and split the signal into two transmission signals, a reference transmission line operable to transmit a first transmission signal, a transmitting antenna coupled to the reference transmission line, and a receiving antenna operable to receive a second transmission signal broadcast from the transmitting antenna. The device also comprises a combiner operable to receive the first transmission signal from the reference transmission line and the second transmission signal from the receiving antenna, and a receiver operable to compare the first transmission signal and the second transmission signal and generate a compared signal.

Embodiment of the present invention may further provide a method for performing presence detection of a body near a device, comprising, emitting, by a transmitter, a signal, receiving, at an in-phase divider coupled to the transmitter, the signal, and splitting the signal into two transmission signals, transmitting, by a reference transmission line, a first transmission signal, receiving, at a receiving antenna, a second transmission signal, receiving, at a combiner, the first transmission signal from the reference transmission line and the second transmission signal from the receiving antenna, comparing, by a receiver, the first transmission signal and the second transmission signal and generating a comparison signal.

Embodiment of the present invention may further provide a non-transitory computer-readable storage medium comprising a plurality of computer-readable instructions tangibly embodied on the computer-readable storage medium, which, when executed by a data processor, provides a method for performing presence detection of a body near a device, the plurality of instructions comprising, emitting, by a transmitter, a signal, receiving, at an in-phase divider coupled to the transmitter, the signal, and splitting the signal into two transmission signals, transmitting, by a reference transmission line, a first transmission signal, receiving, at a receiving antenna, a second transmission signal, receiving, at a combiner, the first transmission signal from the reference transmission line and the second transmission signal from the receiving antenna, comparing, by a receiver, the first transmission signal and the second transmission signal and generating a comparison signal.

Numerous benefits are achieved by way of the present invention over other techniques. For example, embodiments of the present invention provide the ability to determine the presence of an object or body interacting with the control device by measuring the phase difference created by the object or body interacting with the environment around the control device. Another benefit is the reduction in power consumption. Rather than being powered up at all time, in embodiments of the present invention, the control device may be powered down when the presence of an object or body is not detected, and powered up when the presence of an object or body is detected. In some embodiments of the present invention, this can be done without the use of multiple devices and can be accomplished by supplementing pre-existing components in the control device with new components contained entirely within the control device.

These and other embodiments of the invention along with many of its advantages and features are described in more detail in conjunction with the text below and attached figures.

DETAILED DESCRIPTION OF THE INVENTION

Figure 1:
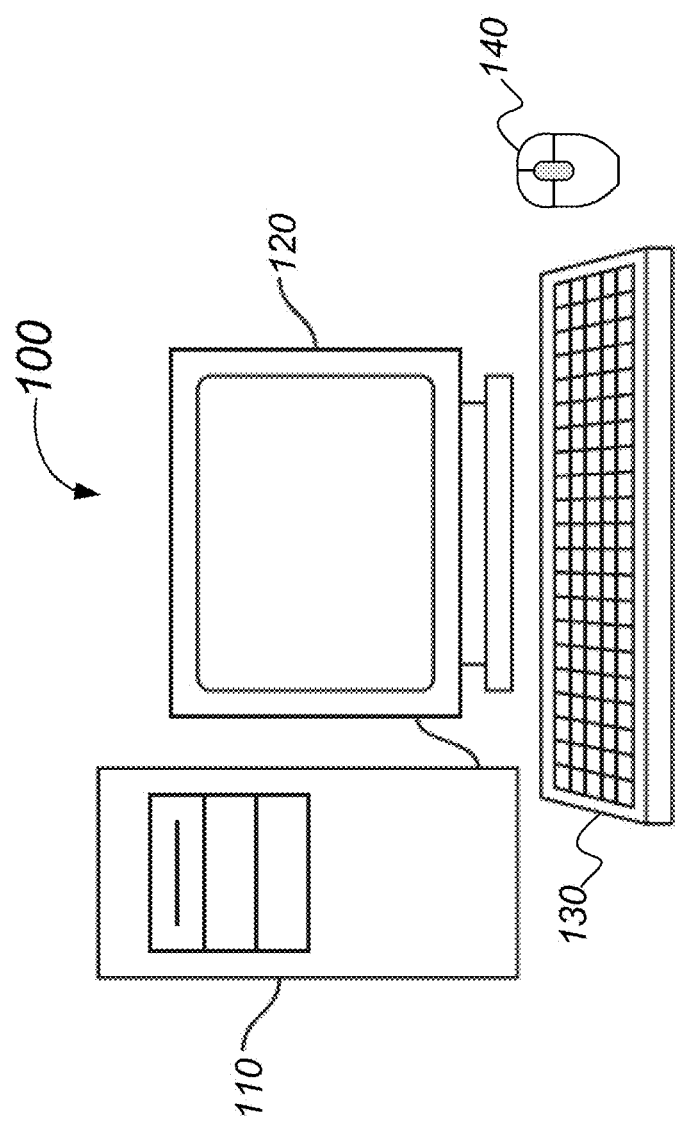
FIG. 1 illustrates a simplified schematic diagram of a computer system according to an embodiment of the invention.

FIG. 1 is a simplified schematic diagram of a computer system 100 according to an embodiment of the invention. Computer system 100 includes a computer 110, a monitor 120, a keyboard 130, and a control device 140. In some embodiments, the control device 140 is a multi-modal mouse control device. In some embodiments, the control device 140 may refer to either or both the keyboard 130 and a mouse control device. The control device 140 may alternatively be referred to as a multi-modal input device 140. For computer system 100, the multi-modal input device 140 and the keyboard 130 are configured to control various aspects of computer 110 and monitor 120. In some embodiments, the multi-modal input device 140 is configured to provide control signals for page scrolling, cursor movement, selection of on screen items, media control, web navigation, presentation control, and other functionality for computer 110, as further described below. Computer 110 may include a machine readable medium (not shown) that is configured to store computer code, such as mouse driver software, keyboard driver software, and the like, where the computer code is executable by a processor (not shown) of the computer 110 to affect control of the computer by the mouse and keyboard 130. It should be noted that the multi-modal input device 140 may be referred to as a mouse, input device, input/output (I/O) device, user interface device, control device, and the like.

Figure 2:
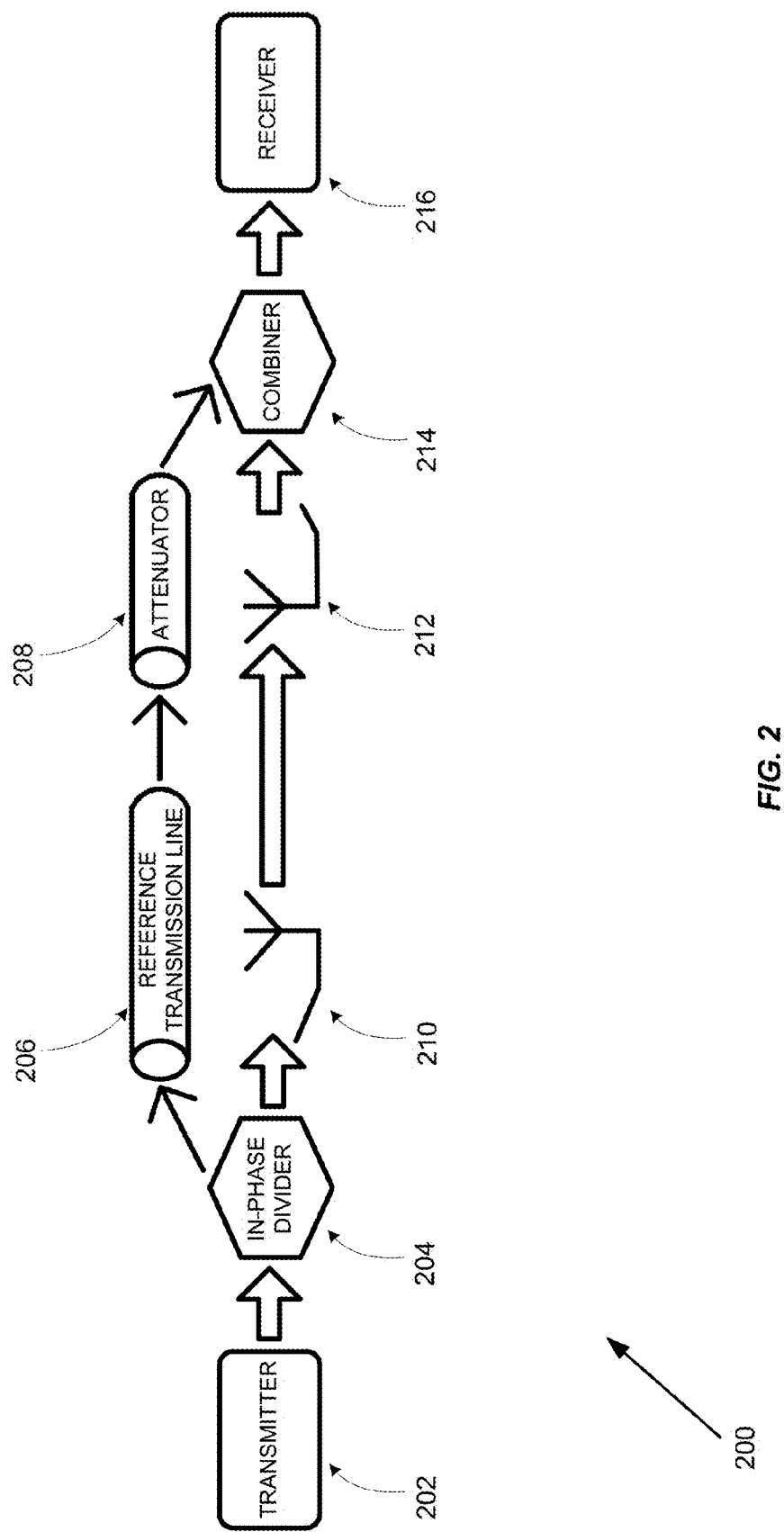
FIG. 2 illustrates a simplified block diagram of the components in a control device utilized to conduct presence detection of a user interacting with the control device according to an embodiment of the invention.

FIG. 2 illustrates a simplified block diagram of the components in a control device utilized to conduct presence detection of a user interacting with the control device, according to an embodiment of the invention. Exemplary forms of control devices include a computer mouse, a keyboard, and a remote control. As depicted in FIG. 2, the control device 140 according to an embodiment of the present invention may comprise a transmitter 202, an in-phase divider 204, a reference transmission line 206, an attenuator 208, a transmitting antenna 210, a receiving antenna 212, a combiner 214, and a receiver 216.

The transmitter 202 is configured to emit a signal. In some embodiments of the present invention, the signal emitted from the transmitter 202 is a continuous, stable wave signal. In some embodiments of the present invention, the signal is a radio frequency (RF) signal emitted a 2.4 gigahertz. In other embodiments, the signal emitted from the transmitter 202 may be at other frequencies.

In some embodiments, the transmitter 202 may also be used to conduct communications between the control device 140 and the computer 110. For example, the transmitter 202 may be used to transmit data between the control device 140 and the computer 110. In some embodiments of the present invention, the data may include directional data or keystroke data. In some embodiments of the present invention, there may be designated separate time slots for transmitting the data signal to the computer 110 and for separate time slots for transmitting the signal for proximity detection. In such embodiments, the separate time slots may prevent signal interference.

The in-phase divider 204 is configured to receive the signal emitted by the transmitter 202 and divide the signal into two separate signals that are in phase with each other. In some embodiments, the two separate signals have the same frequency and the same phase characteristics. The signal may be divided into a reference signal and an over the air signal. An example of a type of in-phase divider 204 is a Wilkinson in-phase divider. Embodiments of the present invention, however, are not limited to the use of a Wilkinson in-phase divider, and other means of dividing signals are also contemplated.

The reference transmission line 206 is configured to transmit the reference signal from the in-phase divider 204 to the combiner 214. In some embodiments of the present invention, the reference transmission line 206 is a 50 ohms transmission line. In some embodiments, the reference signal may have very little variance from the original signal as the phase of the reference signal is not affected by objects or bodies moving close to or around the reference transmission line 206. Examples of reference transmission lines 206 include, but are not limited to, an RF cable or a printed circuit board (PCB) trace.

In some embodiments of the present invention, the reference transmission line 206 may include an attenuator 208 that allows fine tuning capability of the reference transmission line 206 depending on the configuration of the control device 140. In embodiments that include the attenuator 208, the attenuator 208 can bring the amplitude of the reference signal down to the same amplitude as the over the air signal.

The transmitting antenna 210 is configured to transmit the over the air signal from the in-phase divider 204 to the combiner 214, via a receiving antenna 212. The phase of the over the air signal may have a variance caused by an object or body moving closer to or away from the transmitting antenna 210 and the receiving antenna 212. In some embodiments, when the phase of the over the air signal stays relatively stable and maintains a phase equal to or close to the original signal emitted by the transmitter 202, it may indicate that there is no object or body interacting with the environment around the control device 140. In some embodiments, when the phase of the over the air signal varies from the original signal emitted by the transmitter 202, it may indicate that an object or body is interacting with the environment around the control device 140.

The combiner 214 is configured to receive both the reference signal sent via the reference transmission line 206 and the over the air signal transmitted by the transmitting antenna 210. An example of a type of combiner 214 is a Wilkinson combiner. Embodiments of the present invention, however, are not limited to the use of a Wilkinson combiner, and other means of combining signals are also contemplated. In some embodiments of the present invention, the output of the combiner 214 is an RF signal at 2.4 gigahertz that is a varying signal generated by combining the reference signal and the over the air signal and determining that there is a difference between the two signals. Alternative embodiments of the present invention may have a signal that is output at a different frequency, greater or lower than 2.4 gigahertz, and may be dependent on the frequency of the signal received by the combiner 214.

Figure 4:
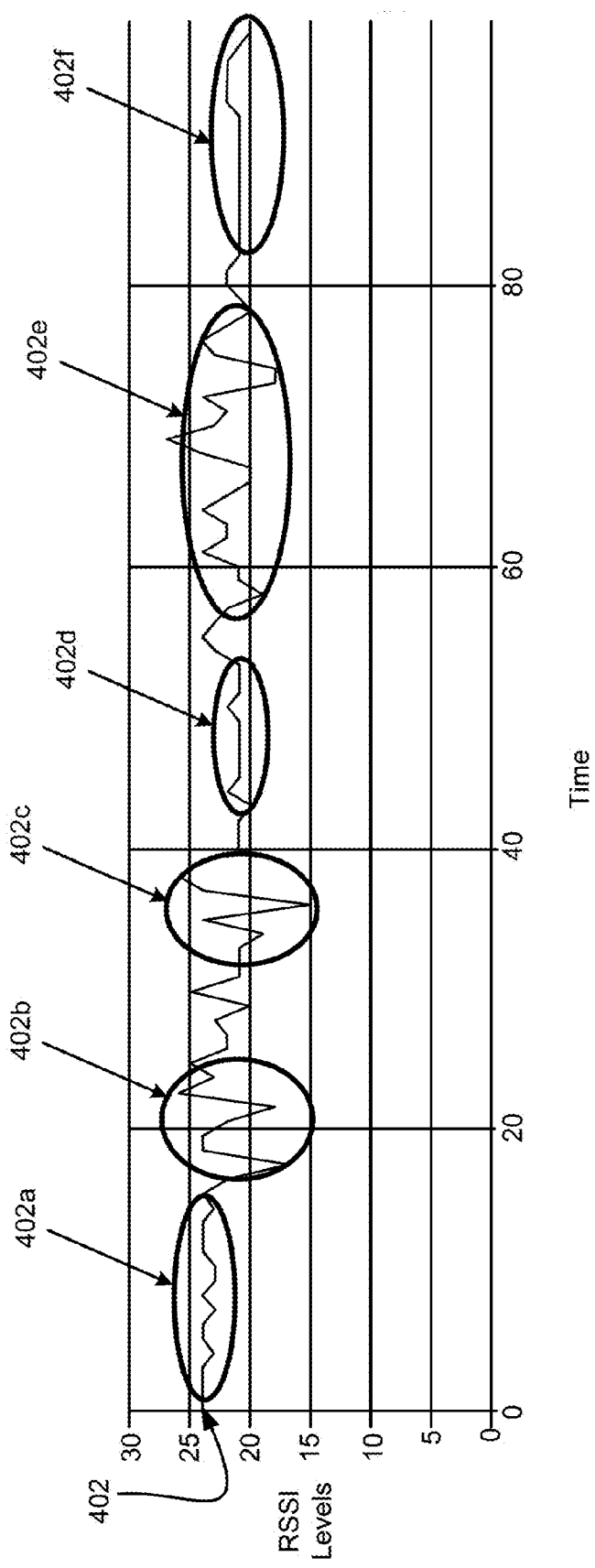
FIG. 4 illustrates a simplified signal diagram illustrating aspects of the process of detecting the presence of a user interacting with a control device according to an embodiment of the invention.

The receiver 216 is configured to receive the combined reference signal and over the air signal from the combiner 214 in a comparison signal. The receiver 216 may be comprised of a received signal strength indicator (RSSI) that is capable of detecting that there is a phase difference between the reference signal and the over the air signal. The receiver may be configured to determine, based on the comparison signal, whether the presence of a moving object or body in the environment around the control device 140 is or is not indicated. This may be determined based on evaluating the comparison signal with a threshold value. In some embodiments, the threshold is a value representing the phase when no moving object or body is detected. An exemplary signal diagram depicting the phase difference between the reference signal and the over the air signal is shown in FIG. 4.

Figure 3:
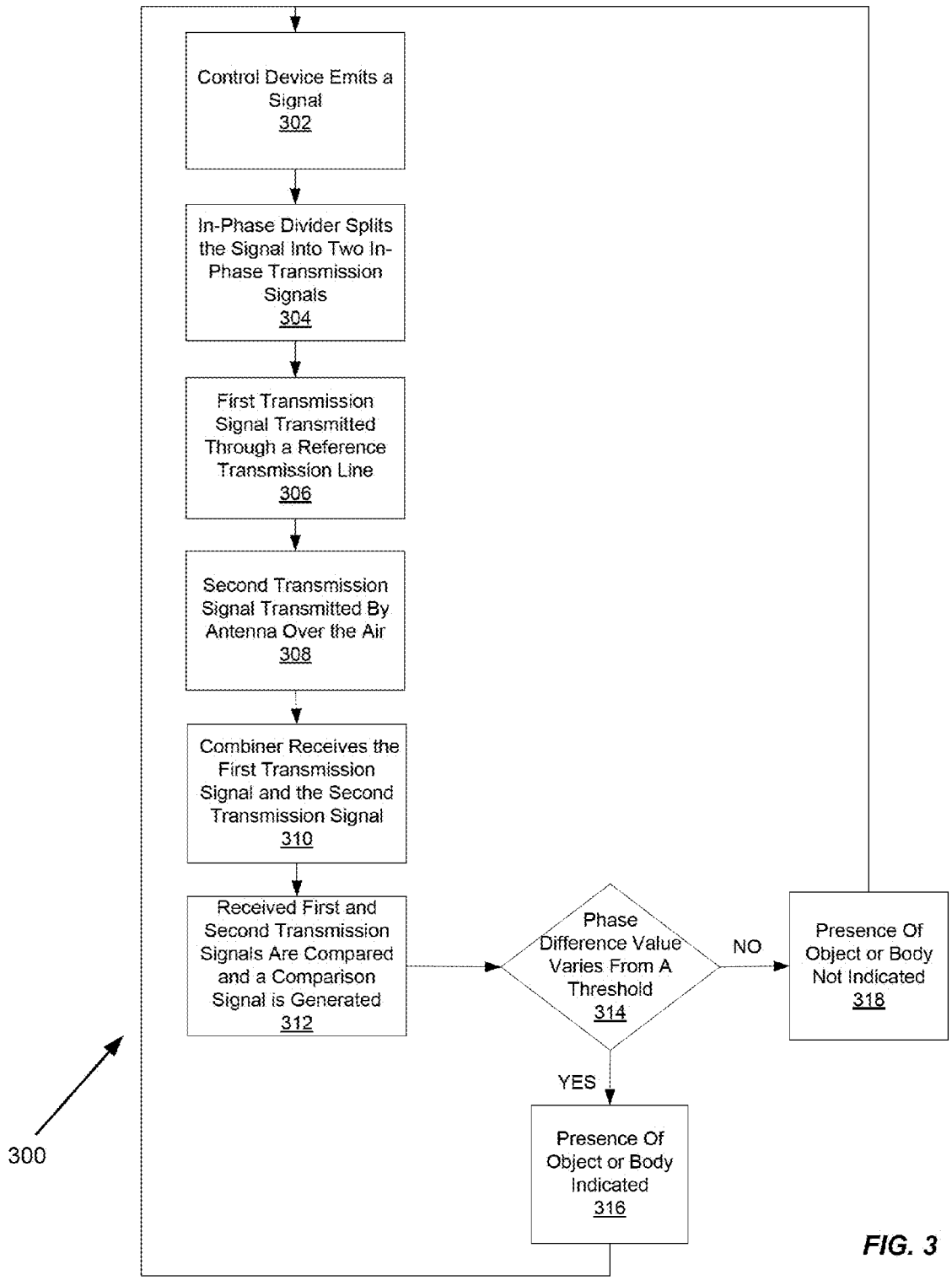
FIG. 3 is a simplified flowchart illustrating a method of detecting the presence of a user in relation to a control device according to an embodiment of the invention.

FIG. 3 is a simplified flowchart illustrating a method of detecting the presence of a user in relation to a control device according to an embodiment of the invention. The method 300 can be performed by processing logic that may comprise hardware (circuitry, dedicated logic, etc.), software (such as is run on a general purpose computing system or a dedicated machine), firmware (embedded software), or any combination thereof.

The method includes emitting a signal (302). According to some embodiments of the present invention, the signal is emitted by transmitter 202 at 2.4 GHz. Other embodiments of the present invention may emit the signal at an RF frequency greater than or less than 2.4 GHz. The signal may be emitted as a continuous wave at a constant frequency or may be emitted in a pulsed manner with constant or varying frequency. In some embodiments of the present invention, the signal may be emitted by the transmitter at a frequency different than 2.4 GHz.

The method further includes receiving the signal and splitting the signal into two in-phase transmission signals (304). According to an embodiment of the present invention, the signal is received by the in-phase divider 204 and split or divided into two separate transmission signals by the in-phase divider 204. The signal may be split into a first transmission signal and a second transmission signal. In some embodiments, the signal may be split into a plurality of signals greater than two. In embodiments of the present invention, the first transmission signal and the second transmission signal are in-phase, such that they have the same frequency and phase as each other. In embodiments of the present invention, the first transmission signal and the second transmission signal have the same frequency as the initial signal emitted by the transmitter 202. In embodiments of the present invention, the phases of the first transmission signal and the second transmission signal will vary from the phase of the initial signal emitted by the transmitter 202.

The method includes transmitting a first transmission signal (306). In some embodiments, the first transmission signal is a reference signal that is transmitted from the in-phase divider 204 to the combiner 214 by the reference transmission line 206. According to embodiments of the present invention, as the first transmission signal is a reference signal that is not affected by changes to the environment around the control device 140, the first transmission signal is transmitted and received at the same frequency as the initial signal.

The method includes receiving a second transmission signal (308). According to embodiments of the invention, the second transmission signal is received by the receiving antenna 212. According to embodiments of the invention, the second transmission signal is broadcasted by a transmitting antenna 210. In some embodiments, the second transmission signal is an over the air signal that is transmitted over the air by the in-phase divider 204 via the transmitting antenna 210.

The method further includes receiving the first transmission signal from the reference transmission line and the second transmission signal from the receiving antenna (310). According to embodiments of the invention, the combiner 214 receives the first transmission signal from the reference transmission line 206 and the second transmission signal from the receiving antenna 212. According to some embodiments of the present invention, as the second transmission signal is transmitted over the air, the phase of the second transmission signal that is received by the receiving antenna 212 may have a different phase than when it was transmitted by the transmitting antenna 210. In embodiments of the present invention, the frequency of the second transmission signal that is received by the receiving antenna 212 may have the same frequency than when it was transmitted by the transmitting antenna 210.

The method includes comparing the first transmission signal and the second transmission signal and generating a comparison signal (312). According to embodiments of the present invention, the comparison signal is a representation of a phase difference between the first transmission signal and the second transmission signal. In some embodiments, the output of the combiner is a power level that is representative of the change in phase (e.g., the phase difference) between first transmission signal and the second transmission signal.

The phase difference may be converted into a numerical value. In some embodiments of the present invention, the numerical value is represented in volts or dBms.

The phase difference may exist as the environment around the control device 140 altered the phase of the second transmission signal that was sent over the air. For example, as an object or body moves closer to, moves away from, or alters the environment around the control device 140, the phase of the second transmission signal may vary. When there is no object or body present and interacting with the second transmission signal, the phase of the second transmission signal may be unchanged and thus there would be no detected phase difference between the first transmission signal and the second transmission signal, or any detected phase difference may be below the threshold.

The method also includes determining whether the phase difference value varies from a threshold (314). The threshold is a value representing the phase difference when no moving object or body is detected. According to embodiments of the present invention, the comparison signal may indicate no phase difference, an increased phase difference or a decreased phase difference. However, as there may be some unintended interaction from the environment (e.g., wind, interference from other devices, system instability), there may be periods where there is not an intended interaction with the control device 140, but a detected phase difference between the first transmission signal and the second transmission signal.

In some embodiments, the threshold is a rolling threshold that is based on the average phase from a plurality of prior phases detected. For example, the rolling threshold may be based on an average of the previous 10 or 20 detected values of the comparison signal. When the phase of the comparison signal does not indicate variation, the rolling threshold may be relatively static. However, when the phase of the comparison signal indicates variation, the rolling threshold may change as the new average is computed.

When the phase difference between the first transmission signal and the second transmission signal is varies from the threshold value, the presence of an object or body may be indicated (316).

Alternatively, if the phase difference between the first transmission signal and the second transmission signal does not vary from the threshold value, that may indicate that the presence of an object or body is not indicated (318). Phase differences may also include those phase differences caused by the environment or system instability.

Once the determination has been made, the system continues to monitor the first transmission signal and the second transmission signal, correlates the received data including the phase difference, and makes a determination as to whether the presence of any object or body is detected.

It should be appreciated that the specific steps illustrated in FIG. 3 provide a particular method of 300 according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 4 is a simplified signal diagram illustrating aspects of a method for aspects of detecting the presence of a user interacting with a control device, according to an embodiment of the present invention. The diagram 400 includes a comparison signal 402, plotted on an x-y graph, with the x-axis representing time in seconds, and the y-axis representing the received signal strength indicator (RSSI) level in dBms of the comparison signal 402.

The RSSI level measures the difference between the first transmission signal sent over the reference transmission line 206 and the second transmission signal broadcast over the air using antennas 210 and 212. As described previously, the two signals are received by the combiner 214 and the difference between the two signals is determined to generate the comparison signal 402. According to some embodiments of the present invention, the RSSI levels of the comparison signal 402 are charted in a power range from 0-30 units. In other embodiments, the RSSI level of the comparison signal 402 is charted in a different power range. In some embodiments of the present invention, the units may be in volts.

The comparison signal 402 illustrated in FIG. 4 includes a plurality of periods 402a-f. The comparison signal 402 and the plurality of periods 402a-f are exemplary and are for illustrative purposes to describe the difference in signal phases that may generated according to an embodiment of the present invention.

In some embodiments, the first period 402a, fourth period 402d, and sixth period 402f indicate no presence detected. Although the first period 402a, fourth period 402d, and sixth period 402f of the comparison signal indicate some variance, these variances may be below a threshold value. Signal variances in the compared signal 402 that are below a predetermined threshold value may be treated as interference, system instability, or caused by other unintended disturbances in the environment.

In some embodiments of the present invention, the second period 402b, the third period 402c, and the fifth period 402e indicate the presence of an object or body near the control device 140. The larger phase of the second period 402b may be indicative that the object or body is moving away from the control device 140, while the smaller phase of the fourth period 402d may be indicative that the object or body is moving towards the control device 140. The phase of the fifth period 402e may indicate that the object or body is moving close to and around the control device 140.

According to embodiments of the present invention, the periods indicating no presence detected may nonetheless contain fluctuations in the signal phase caused by minor changes in the environment (e.g. air movement, noise, an object moving far away in another room). According to embodiments of the present invention, determining which fluctuations in the signal phase indicate presence detected may be based on a predetermined threshold. For example, fluctuations in the signal phase below the predetermined threshold may be determined to be not detected presence, while fluctuations in the signal phase equal to or greater than the predetermined threshold may be determined to be detected presence.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teaching provided herein, a person of ordinary skill in the art will appreciate other ways and/or methods to implement the present invention.

In embodiments, any of the entities described herein may be embodied by a computer that performs any or all of the functions and steps disclosed.

It should be noted that any recitation of "an", "an" or "the" is intended to mean "one or more" unless specifically indicated to the contrary.

It is also understood that the examples and embodiments described herein are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. A method for performing presence detection of a body near a device, the method comprising:
    emitting, by a transmitter coupled to the device, a signal for presence detection in a first designated time slot separate from a second designated time slot for data transmission, the data transmission including control signals from the device to a computing device;
    splitting, by the device, the signal into a first transmission signal and a second transmission signal; and
    transmitting, by the device, the first transmission signal and the second transmission signal.

2. The method of claim 1, further comprising:
    receiving, by the device, the first transmission signal and the second transmission signal, wherein the first transmission signal is transmitted along a reference transmission line, and wherein the second transmission signal is received by a receiving antenna;
    comparing, by the device, the first transmission signal and the second transmission signal; and
    generating, by the device, a comparison signal.

3. The method of claim 2, wherein the comparison signal is characterized by a value indicating the phase difference between the first phase of the first transmission signal and the second phase of the second transmission signal.

4. The method of claim 3, further comprising:
    comparing, by the device, the value indicating the phase difference to a threshold value.

5. The method of claim 4, wherein when the value indicating the phase difference varies from the threshold value, the presence of the body near the device is determined.

6. The method of claim 4, wherein the threshold value is a value representing the phase difference when no body adjacent to the device is detected.

7. The method of claim 4, wherein the threshold value is measured in dBm.

8. The method of claim 1, wherein the signal is characterized by a phase, the first transmission signal characterized by a first phase, and the second transmission signal is characterized by a second phase.

9. The method of claim 1, wherein the signal emitted by the transmitter is characterized by an RF frequency.

10. The method of claim 1, wherein the signal emitted by the transmitter is a continuous wave.

11. A device comprising:
    a transmitter to emit a signal for presence detection in a first transmission signal and a second transmission signal,
        wherein the first transmission signal has a first designated time slot for data transmission,
        wherein the second transmission signal has a second designated time slot for data transmission,
        wherein the first designated time slot is separate from a second designated time slot for data transmission, and
        wherein the data transmission for the first and second transmission signals include control signals from the device to a computing device;

a transmission line to transmit the first transmission signal; and a first antenna to transmit the second transmission signal.

12. The device of claim 11, further comprising:
a second antenna to receive the second transmission signal broadcast from the first antenna.

13. The device of claim 11, wherein the signal is characterized by a phase, the first transmission signal characterized by a first phase, and the second transmission signal is characterized by a second phase.

14. The device of claim 13, wherein the second phase of the second transmission signal varies in response to motion of a body adjacent to the device.

15. The device of claim 13, further comprising:
a receiver to compare the first transmission signal and the second transmission signal and generate a compared signal.

16. The device of claim 15
wherein the compared signal is characterized by a value indicating the phased difference between the first phase of the first transmission signal and the second phase of the second transmission signal.

17. The device of claim 16, wherein when the value indicating the phase difference varies from a threshold value, the presence of the body near the device is determined.

18. The device of claim 17, wherein the threshold value is measured in dBm.

19. The device of claim 11, wherein the signal emitted by the transmitter is characterized by an RF frequency.

20. The device of claim 11, wherein the signal emitted by the transmitter is a continuous wave.

* * * * *